US010633018B2

(12) United States Patent
Thimár

(10) Patent No.: US 10,633,018 B2
(45) Date of Patent: Apr. 28, 2020

(54) EXTERNAL WATCHDOG WITH INTEGRATED BACKWARD REGENERATION SUPPORT

(71) Applicants: THYSSENKRUPP PRESTA AG, Eschen (LI); thyssenkrupp AG, Essen (DE)

(72) Inventor: Zoltán Thimár, Szar (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 52 days.

(21) Appl. No.: 16/073,277

(22) PCT Filed: Feb. 5, 2016

(86) PCT No.: PCT/EP2016/052531
§ 371 (c)(1),
(2) Date: Jul. 26, 2018

(87) PCT Pub. No.: WO2017/133788
PCT Pub. Date: Aug. 10, 2017

(65) Prior Publication Data
US 2019/0077451 A1     Mar. 14, 2019

(51) Int. Cl.
*B62D 5/04*     (2006.01)
*G05B 9/02*     (2006.01)
(Continued)

(52) U.S. Cl.
CPC ........... *B62D 5/0493* (2013.01); *B62D 5/046* (2013.01); *B62D 5/0484* (2013.01); *G05B 9/02* (2013.01);
(Continued)

(58) Field of Classification Search
CPC .... B62D 5/0493; B62D 5/046; B62D 5/0484; G06F 11/0757; G05B 19/0425; G05B 19/042; G05B 9/02
(Continued)

(56) References Cited

U.S. PATENT DOCUMENTS 5,668,721 A *  9/1997  Chandy ................ B62D 5/0466
                                              180/412
2008/0309270 A1* 12/2008 Suzuki ................. B62D 5/0484
                                              318/432
(Continued)

FOREIGN PATENT DOCUMENTS

DE    102008043646 A    5/2010
DE    102011054435 A    4/2012
JP       2004265322 A    9/2004

OTHER PUBLICATIONS

English Translation of International Search Report issued in PCT/EP2016/052531, dated Sep. 27, 2016 (dated Oct. 6, 2016).

*Primary Examiner* — Muhammad Shafi
(74) *Attorney, Agent, or Firm* — thyssenkrupp North America, Inc.

(57) ABSTRACT

An electric power steering apparatus for assisting steering of a motor vehicle by conferring torque generated by an electric motor to a steering mechanism, includes a steering controller, which receives signals representative of at least the torque (TTS) applied to a steering wheel and determining a target motor torque (Td), with a microcontroller unit (MCU) and an electronic control unit (WD). A motor controller includes an inverter which transforms from target motor torque (Td) generated target voltages (U1) into motor currents (I1). The WD comprises a memory in which state variables of the MCU are stored and a timer which monitors (Continued)

a blackout time of the MCU, wherein the MCU and WD are linked via a communication bus and a reset line.

8 Claims, 5 Drawing Sheets

(51) Int. Cl.
*G05B 19/042* (2006.01)
*G06F 11/07* (2006.01)

(52) U.S. Cl.
CPC ....... *G05B 19/042* (2013.01); *G05B 19/0425* (2013.01); *G06F 11/0757* (2013.01)

(58) Field of Classification Search
USPC .......................................................... 701/41
See application file for complete search history.

(56) References Cited

U.S. PATENT DOCUMENTS

| | | | |
|---|---|---|---|
| 2008/0315809 A1* | 12/2008 | Tamaizumi | B62D 5/046 318/400.23 |
| 2009/0224707 A1* | 9/2009 | Williams | B62D 5/0481 318/400.02 |
| 2015/0178144 A1 | 6/2015 | Aoki | |

* cited by examiner

EXTERNAL WATCHDOG WITH INTEGRATED BACKWARD REGENERATION SUPPORT

CROSS REFERENCE TO RELATED APPLICATION

This application is a U.S. National Stage Entry of International Patent Application Ser. No. PCT/EP2016/052531, filed Feb. 5, 2016, the entire contents of which are incorporated herein by reference.

FIELD The present disclosure generally relates to a power steering system, in particular, an electric power steering system for assisting steering of a motor vehicle.

BACKGROUND

Functional safety is a key issue for automotive devices, in particular automotive devices used in vehicles. With increasing technological complexity, software contents and mechatronic implementation there is an increasing risk from systematic failures and random hardware failures. Electronic Control Units (ECU) are provided within a vehicle to perform all kind of different functions. These Electronic Control Units comprise microcontroller units (MCU) or microprocessors to control devices for performing these different functions. There is a risk that a microcontroller unit of the ECU has a malfunction. In conventional ECUs external control units, so-called external watchdogs (WD), have been used to increase functional safety with respect to a specific function provided by the microcontroller of the ECU and its peripheral components. For example, in a conventional system there can be provided an external watchdog unit monitoring clock frequencies. Single microprocessor fail-safe systems are able to detect critical failures and to bring the system into a safe state.

JP-A-2004-265322 discloses a failure monitoring apparatus with a watchdog for microcomputers, which is capable of monitoring a faulty operation of the MCU. The WD monitors any anomaly in the MCU and further counts the number of times of occurrence of anomalous operations of the MCU. As long as the number of times of occurrence of the anomalous operation is smaller than a reference number of times, the WD generates a pulsed reset signal and tries to restore the MCU to normal state. If the number of times of occurrence of anomalous operation exceeds the reference number of times, the WD generates a reset hold signal and stops the control by the MCU.

However, if the controlled object of the microcomputer is an electric motor, it is stopped immediately when an anomalous operation occurs in the microcomputer. In case of steering assistance in an electric power steering apparatus this leads to sudden loss of assistance. This is very unpleasant for the driver, because the steering response is unusual which makes the vehicle difficult to steer.

Conventional solutions for fail-safe steering assistance systems are thus fully redundant systems with two or more microprocessors, which are expensive.

US 2015/01178144 A1 discloses a watchdog that detects an anomalous operation of the MCU, a failsafe control device that executes a failsafe control operation, a first reset device that outputs a reset signal for resetting the MCU for a predetermined time, a counting device that counts a number of times of occurrence of the anomalous operation and a second reset device that outputs the reset signal and holds an output of the reset signal when the number of times of occurrence reaches a predetermined number of times. When anomalous operation occurs in the MCU, the operation is restored to normal state by a reset signal, failsafe control is carried out as control by the MCU. In the failsafe control, the controlled object is controlled to the safety side, so that even when an anomaly occurs in normal control any anomaly may not occur in failsafe control. Therefore, it is possible to enhance the possibility that control by the MCU will be continued as much as possible with safety taken into account.

A disadvantage is, that the state variables are lost during reset.

Thus a need exists an electric power steering apparatus with a failsafe MCU, which continues electronic control in a safe and user-friendly way, even if a failure occurs in the operation of the MCU.

DETAILED DESCRIPTION

Figure 1:
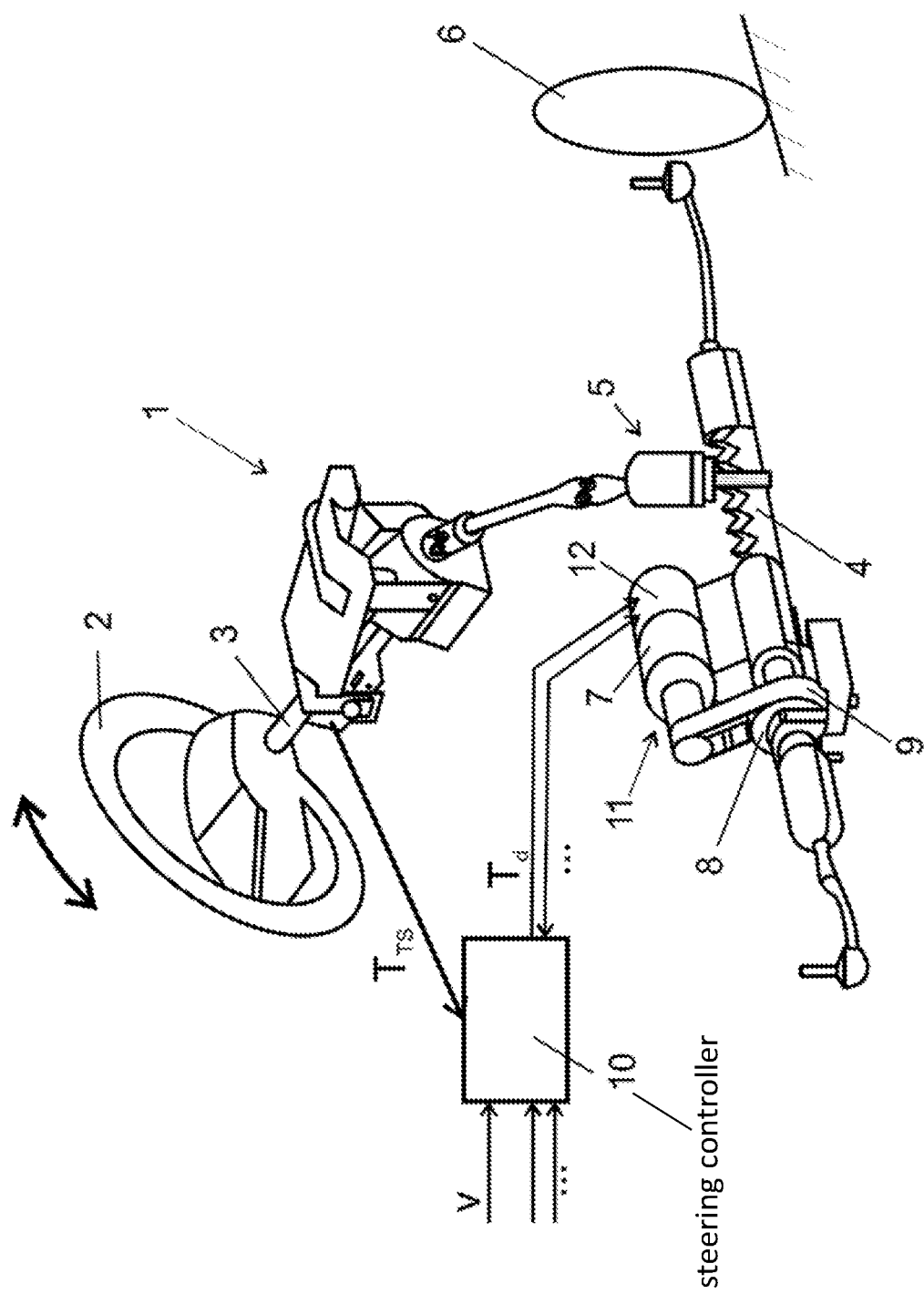
FIG. 1 is a schematic view of an electric power steering apparatus.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an electric power steering system.

Accordingly, an electric power steering apparatus for assisting steering of a motor vehicle by conferring torque generated by an electric motor to a steering mechanism is provided, the apparatus comprising a steering controller, which receives signals representative of at least the torque applied to a steering wheel and determining a target motor torque, with a MCU and a WD and a motor controller comprising an inverter, which transforms target voltages having been generated on the basis of the target motor torque, into motor currents, wherein the WD comprises a memory, in which state variables of the MCU are stored and a timer which monitors a blackout time of the MCU, and wherein the MCU and WD are linked via a communication bus and a reset line.

The WD is used to restore the system to a known value in case of anomalous operation. In order to do this, regular storage of system state is carried out.

Preferably, the WD transmits the stored state variables and/or the blackout time on request of the MCU to the MCU via the communication bus. In the following the communication bus is also described as communication line.

In one preferred embodiment, the WD detects an anomalous operation of the MCU and resets the MCU.

Preferably, the MCU is backward regenerated with the state variables from the WD, if the blackout time is less than a predefined threshold value. The backward regeneration process is time-limited, it must be ensured that it fully happens in process safety time.

It is further favoured, that the MCU is set to safe state, if the blackout time is higher than a predefined threshold value.

The object of the present invention is additionally achieved by a method of MCU control in an electric power steering apparatus having the features of claim 7. Preferred embodiments of the method are the subject of the subclaim.

Accordingly, a method of MCU control is provided, with the following steps:
Storage of MCU state variables in WD memory;
Determination of MCU anomalous operation;
In case of anomalous operation, reset of MCU and start of blackout time measurement of a WD timer;
Request of state variables from WD memory by the MCU;
Restore state variables by the MCU;
Request blackout time by the MCU from the WD timer;
Send blackout time by WD;
If blackout time is less than a predefined threshold value, operate the MCU with restored state variables;
If blackout time is higher than the predefined threshold value, set the MCU to safe state.

In one preferred embodiment, the determination of MCU anomalous operation is done by WD, which based on the determination resets of the MCU.

Preferred embodiments of the present invention will be described with reference to the drawings. In all figures the same reference signs denote the same components or functionally similar components.

FIG. 1 is a schematic diagram of an electric power steering apparatus 1. A steering wheel 2 is fixed to a steering shaft 3, and the steering shaft 3 is coupled to a rack 4 via a rack-and-pinion mechanism 5. Rotation of the steering shaft 3 accompanying a steering operation is converted into a reciprocating linear motion of the toothed rack 4 by the rack-and-pinion mechanism 5. The linear motion of the rack 4 changes the steering angle of the steered wheels 6. To provide steering assistance, an electric motor 7 mounted to the side of the rack housing drives a ball-screw mechanism 8 via a toothed rubber belt 9.

Electric power assist is provided through a steering controller 10 and a power assist actuator 11 comprising the electric motor 7 and a motor controller 12. The steering controller 10 receives signals representative of the vehicle velocity v and the torque $T_{TS}$ applied to the steering wheel 2 by the vehicle operator. In response to the vehicle velocity v, the operator torque $T_{TS}$, the controller 10 determines the target motor torque $T_d$ and provides the signal through to the motor controller 12, where the duty cycles are calculated to produce the phase currents.

Figure 2:
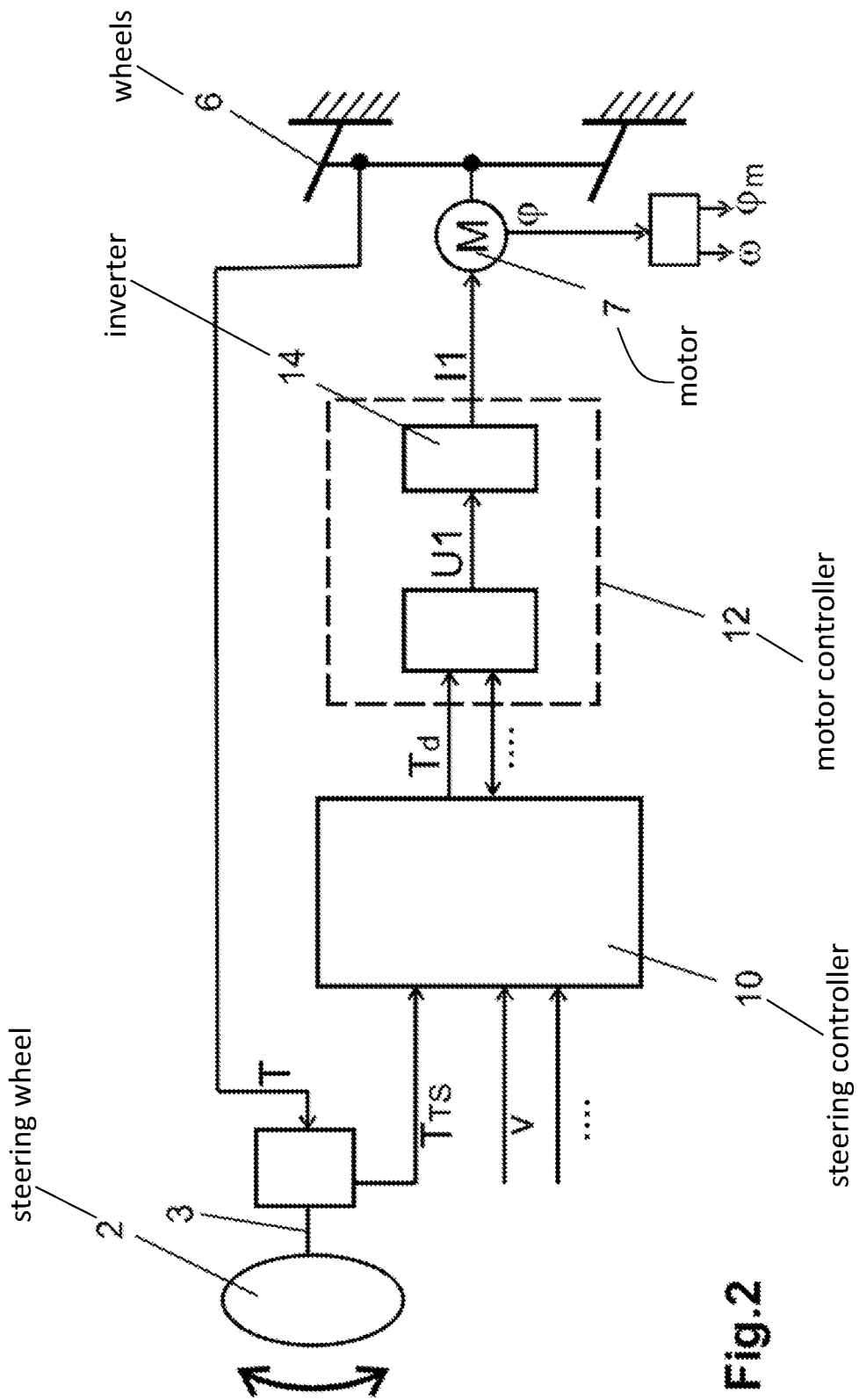
FIG. 2 is a block diagram showing an electrical structure of the electric power steering apparatus.

FIG. 2 shows a block diagram of the electrical structure of the electric power steering apparatus 1. The steering controller 10 receives signals representative of the vehicle velocity v and the torque $T_{TS}$ applied to the steering wheel 2 by the vehicle operator and derives the target motor torque $T_d$. This target motor torque $T_d$ is fed to the motor controller 12 which determines the voltage input U1 for the inverter 14. The inverter 14 transforms the resulting voltages into the three-phase-symmetrical coordinate system of the motor 7 into motor currents $I1=I_U, I_V, I_W$.

Figure 3:
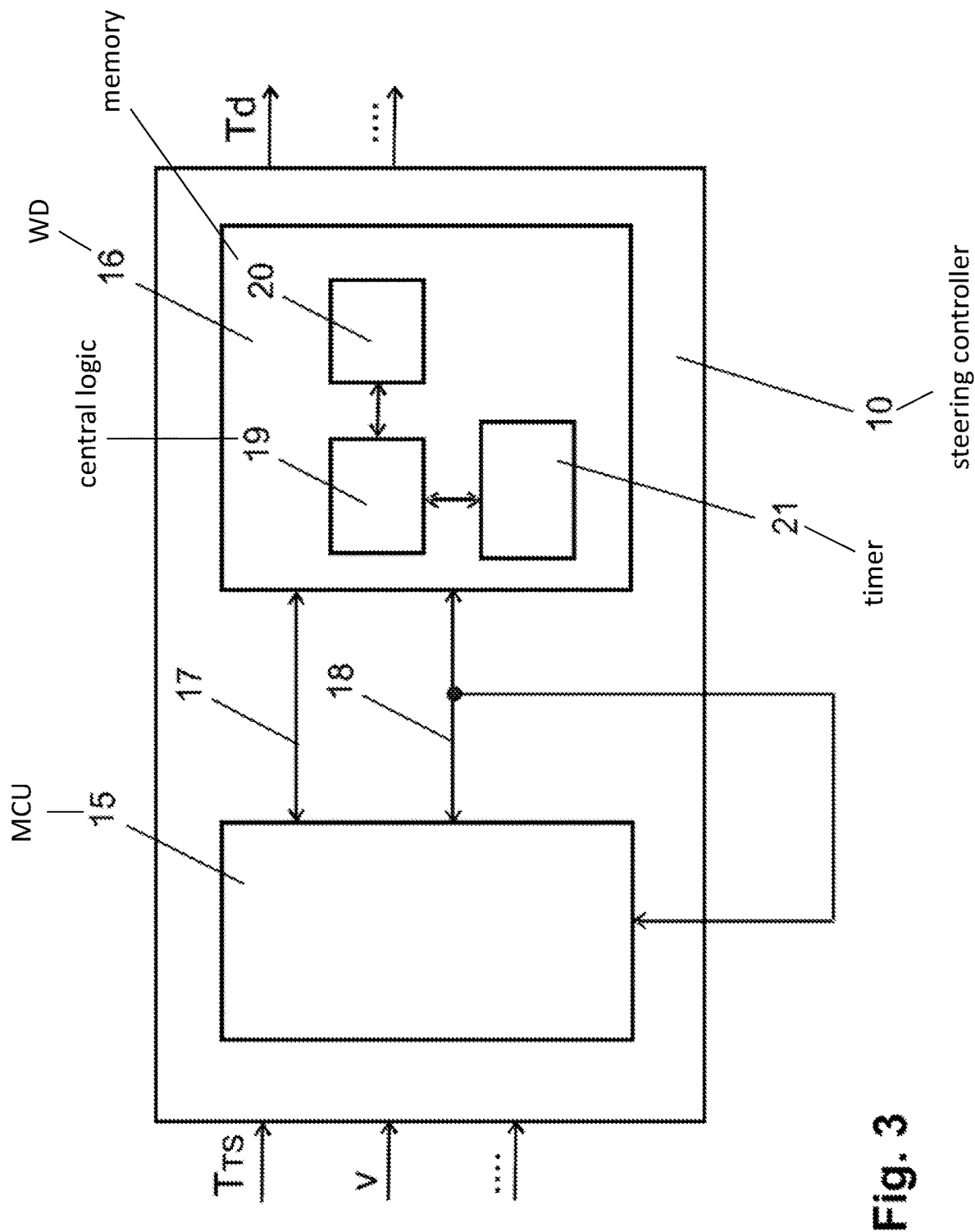
FIG. 3 is a detail view of the electrical structure of the Electronic Control Unit of the electric power steering apparatus.

The failsafe system of the MCU 15 is shown in detail in FIG. 3.

The steering controller 10 comprises a MCU 15 and an external WD 16. A communication bus 17 and a reset line 18 link the MCU 15 and the WD 16. The WD 16 comprises a central logic 19, a memory 20 and a timer 21. The MCU 15 and WD 16 work in parallel.

Figure 4:
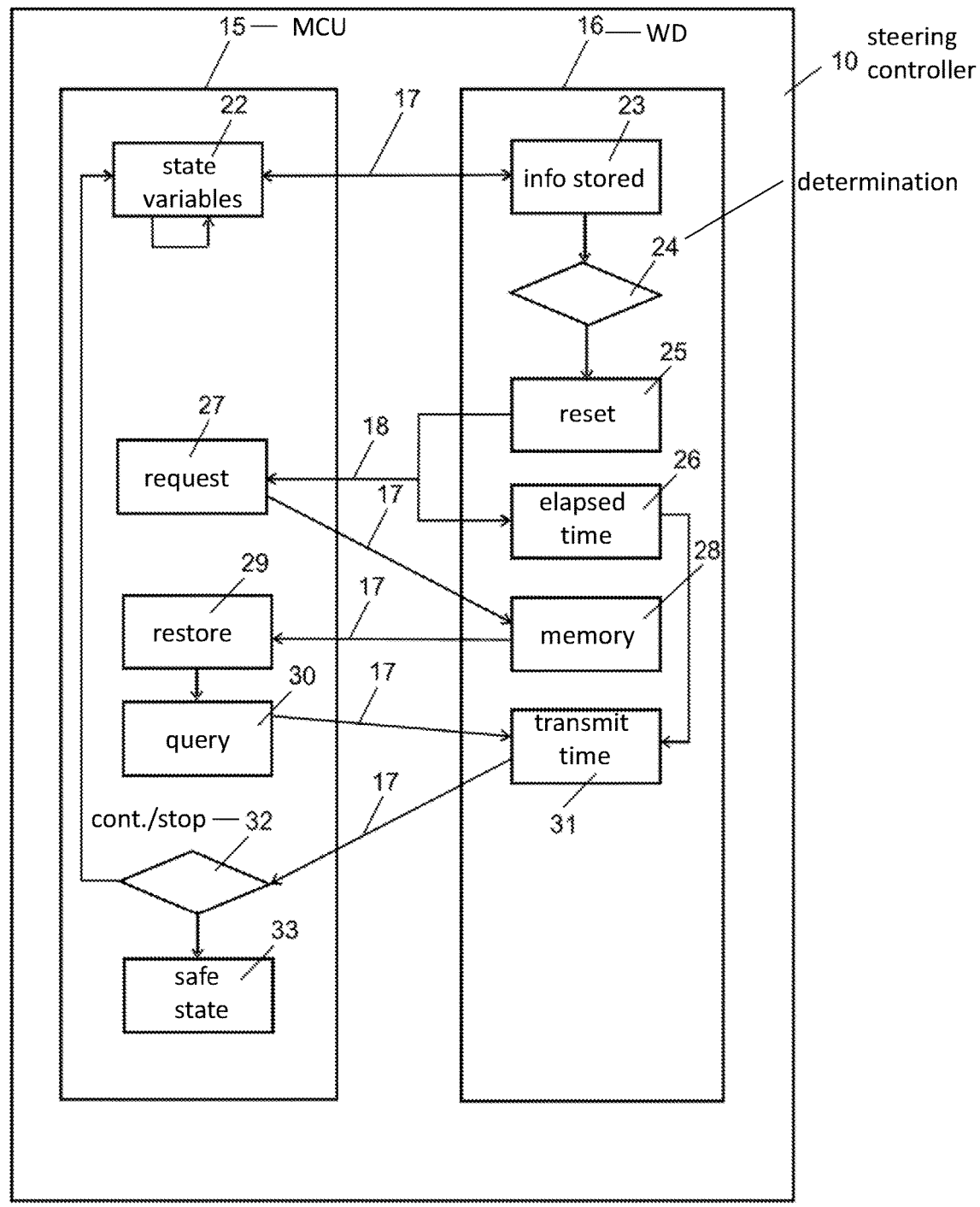
FIG. 4 is a flowchart of communication between MCU and WD with WD initiated reset of MCU in the ECU.

FIG. 4 shows the communication between the MCU 15 and the WD 16 in case of WD 16 triggered reset of the MCU 15. During normal operation, the MCU 15 sends its state variables 22 via the communication bus 17 to the watchdog 16 periodically. This information is stored 23 in the WD memory 20. The WD 16 determines 24 if the MCU 15 works correctly. In an anomalous state the WD 16 resets 25 the MCU 15 to a normal state. Via the reset line 18 the WD 16 monitors the reset and the elapsed time 26 in the timer 21. The MCU 15 restores 29 its state variables via the communication bus 17 by request 27 to the WD. After restoration 29 of the state variables from the memory 28, MCU 15 queries 30, 31 the blackout time from the WD timer 21. If the blackout time is short enough, it is assumed that the state variables are still valid, the MCU 15 continues operation from where it stopped 32, otherwise it remains in safe state 33 without operation.

Figure 5:
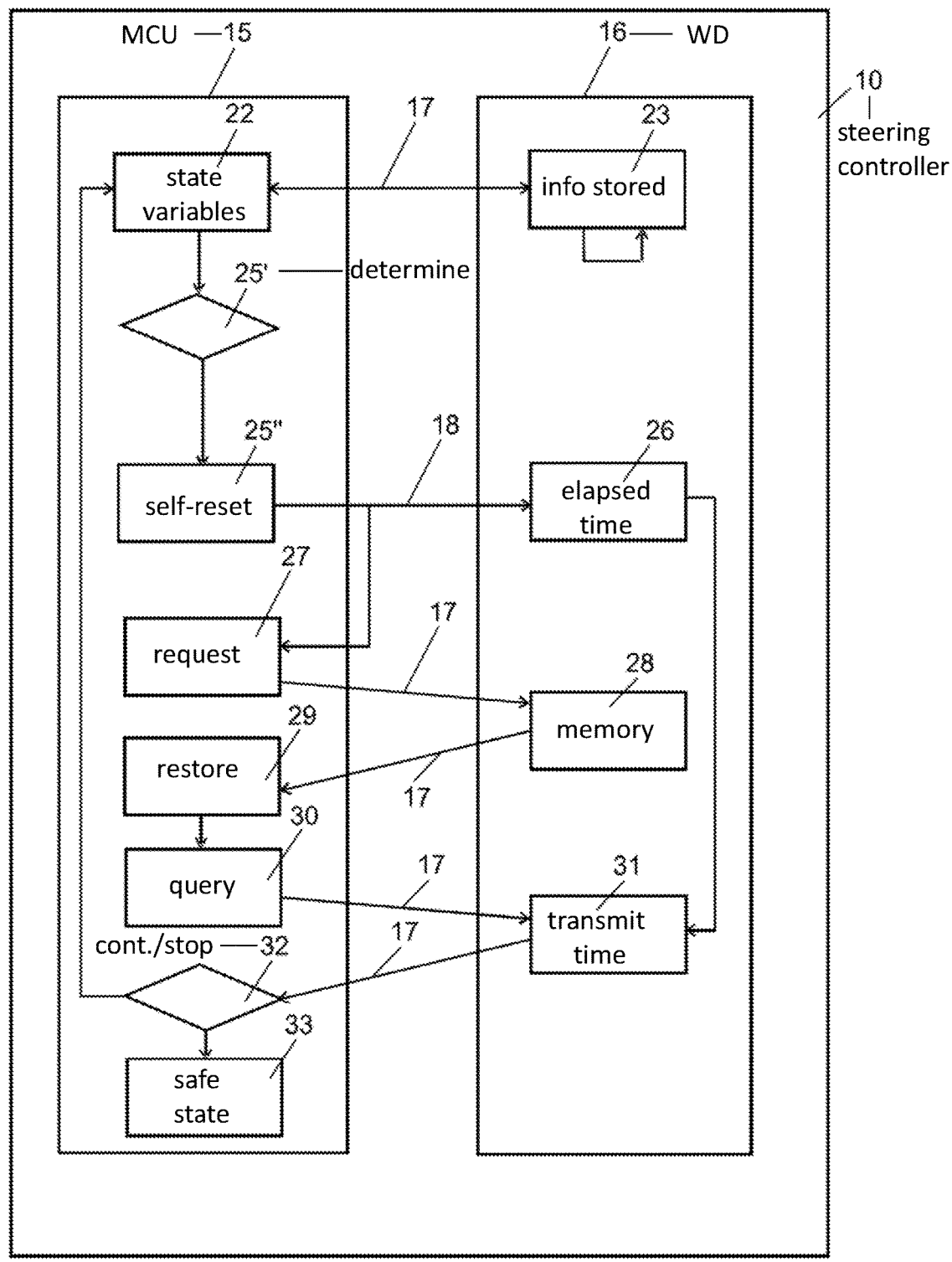
FIG. 5 is a flowchart of communication between MCU and WD with MCU self-reset in the ECU.

FIG. 5 shows the communication between the MCU 15 and the WD 16 in case of MCU 15 self-reset.

During normal operation, the MCU 15 sends its state variables 22 via the communication bus 17 to the watchdog 16 periodically. This information is stored 23 in the WD 16 memory 20. The MCU 15 determines if it works correctly 25'. In an anomalous state the MCU 15 is self-reset 25". Via the reset line 18 the WD 16 monitors the elapsed time 26 in the timer 21. The MCU 15 restores 29 its state variables 22 via the communication bus 17 by request 27 to the WD 16. After restoration of the state variables from the memory 28, 29, MCU 15 queries 30, 31 the blackout time from the WD timer 21. If the blackout time is short enough to assume that the state variables are still valid, MCU continues operation 32 based on stored state variables, otherwise it remains in safe state 33 without operation.

The inventive backward regeneration allows continued electronic control by the MCU even if failure occurs during operation. It provides an off-the-shelf safe solution for fail operational systems, which is not limited to specific microcontrollers or hardware platforms.

What is claimed is:

1. An electric power steering apparatus for assisting steering of a motor vehicle by conferring torque generated by an electric motor to a steering mechanism, the apparatus comprising:
a steering controller, which is configured to receive signals representative of at least the torque (TTS) applied to a steering wheel and determine a target motor torque (Td), with a microcontroller unit (MCU) and a watchdog (WD);
a motor controller comprising an inverter which transforms from target motor torque (Td) generated target voltages (U1) into motor currents (I1),
wherein the WD comprises a memory in which state variables of the MCU are stored and a timer which monitors a blackout time of the MCU, wherein the MCU and WD are linked via a communication bus and a reset line.

2. The electric power steering apparatus of claim 1, wherein the WD, on request from the MCU, transmits the stored state variables to the MCU via the communication bus.

3. The electric power steering apparatus of claim 1, wherein the WD, on request of the MCU, transmits the blackout time to the MCU via the communication bus.

4. The electric power steering apparatus of claim 1, wherein the WD detects an anomalous operation of the MCU and resets the MCU.

5. The electric power steering apparatus of claim 1, wherein the MCU is backward regenerated with the state variables from the WD when the blackout time is less than a predefined threshold value.

6. The electric power steering apparatus of claim 1, wherein the MCU is in safe state when the blackout time is higher than a predefined threshold value.

7. A method of controlling an MCU in an electric power steering apparatus for assisting steering of a motor vehicle by conferring torque generated by an electric motor to a steering mechanism, the method comprising:
  receiving with a steering controller signals representative of at least a torque (TTS) applied to a steering wheel and determining a target motor torque (Td), with a microcontroller unit (MCU) and a watchdog (WD);
  transforming with a motor controller comprising an inverter from the target motor torque (Td) target voltages (U1) into motor currents (I1);
  storing MCU state variables in a WD memory;
  detecting an MCU anomalous operation;
  when the MCU anomalous operation is detected, resetting the MCU and starting a blackout time measurement of a WD timer;
  requesting the MCU state variables from the WD memory by the MCU;
  restoring the MCU state variables by the MCU;
  requesting the blackout time measurement by the MCU from the WD timer;
  sending the blackout time measurement by the WD;
  when the blackout time measurement is less than a predefined threshold value, operating the MCU with restored state variables; and
  when the blackout time measurement is higher than the predefined threshold value, setting the MCU to a safe state.

8. The method according to claim 7, wherein the detection of MCU anomalous operation is performed by the WD, which based on the determination resets the MCU.

* * * * *